(12) United States Patent
Ebihara et al.

(10) Patent No.: US 12,529,709 B2
(45) Date of Patent: Jan. 20, 2026

(54) AUTOMATIC ANALYSIS DEVICE

(71) Applicant: HITACHI HIGH-TECH CORPORATION, Tokyo (JP)

(72) Inventors: Daisuke Ebihara, Tokyo (JP); Shinya Matsuoka, Tokyo (JP); Taku Sakazume, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 1059 days.

(21) Appl. No.: 17/622,908

(22) PCT Filed: Jul. 2, 2020

(86) PCT No.: PCT/JP2020/026012
§ 371 (c)(1),
(2) Date: Dec. 27, 2021

(87) PCT Pub. No.: WO2021/002431
PCT Pub. Date: Jan. 7, 2021

(65) Prior Publication Data
US 2022/0268798 A1 Aug. 25, 2022

(30) Foreign Application Priority Data
Jul. 4, 2019 (JP) .................. 2019-125016

(51) Int. Cl.
*G01N 35/10* (2006.01)
*G01N 1/44* (2006.01)
(Continued)

(52) U.S. Cl.
CPC .......... *G01N 35/1095* (2013.01); *G01N 1/44* (2013.01); *G01N 30/7233* (2013.01);
(Continued)

(58) Field of Classification Search
CPC ............ G01N 35/0098; G01N 1/4022; G01N 35/1095; G01N 35/00584; G01N 30/7233;
(Continued)

(56) References Cited

U.S. PATENT DOCUMENTS 10,379,132 B1 * 8/2019 Wiederin ................. G01N 1/38
10,436,794 B1 * 10/2019 Isailovic ............ G01N 30/8679
(Continued)

FOREIGN PATENT DOCUMENTS

JP      10-260118 A      9/1998
JP      2009-042117 A    2/2009
(Continued)

OTHER PUBLICATIONS

Extended European Search Report received in corresponding European Application No. 20834676.7 dated Jul. 14, 2023.
(Continued)

*Primary Examiner* — Shogo Sasaki
(74) *Attorney, Agent, or Firm* — MATTINGLY & MALUR, PC

(57) ABSTRACT

The automatic analysis device includes an evaporative concentration unit configured to perform a concentration process of evaporating an extract solution obtained by extracting a component to be analyzed in a sample to concentrate the component to be analyzed; an analysis unit configured to analyze the component to be analyzed of the sample; and a control unit configured to control operations of the analysis unit and the evaporative concentration unit. The control unit determines whether to perform an evaporative concentration process on a component to be analyzed in the sample, and controls the evaporative concentration unit to concentrate a component to be analyzed in a sample which is determined to be subjected to an evaporative concentration process. The
(Continued)

sample to be subjected to the evaporative concentration process is stored, and the control unit selects whether to perform the evaporative concentration on each sample or not based on stored content.

9 Claims, 8 Drawing Sheets

(51) Int. Cl.
*G01N 30/72* (2006.01)
*G01N 35/00* (2006.01)
*G01N 35/02* (2006.01)
*G01N 30/02* (2006.01)

(52) U.S. Cl.
CPC ... *G01N 35/00594* (2013.01); *G01N 35/0098* (2013.01); *G01N 35/025* (2013.01); *G01N 2030/025* (2013.01); *G01N 2035/00376* (2013.01)

(58) Field of Classification Search
CPC .. G01N 1/44; G01N 35/025; G01N 35/00594; G01N 2030/025; G01N 2035/00356; G01N 2035/00376; G01N 2001/4027
See application file for complete search history.

(56) References Cited

U.S. PATENT DOCUMENTS

| | | |
|---|---|---|
| 2004/0219067 A1 | 11/2004 | Ichimura et al. |
| 2013/0078165 A1 | 3/2013 | Sandra et al. |
| 2014/0224430 A1 | 8/2014 | Yamazaki et al. |
| 2016/0346712 A1 | 12/2016 | Fatemi |
| 2018/0292368 A1 | 10/2018 | Franz et al. |
| 2018/0321237 A1* | 11/2018 | Isailovic .......... G01N 33/56911 |
| 2018/0348112 A1 | 12/2018 | Nagai et al. |
| 2019/0025165 A1* | 1/2019 | Oberreit ............... G01N 1/4022 |
| 2019/0086437 A1* | 3/2019 | Reed .................... G01N 35/085 |
| 2024/0019347 A1* | 1/2024 | Iwasa ................ G01N 35/1009 |

FOREIGN PATENT DOCUMENTS

| | | |
|---|---|---|
| JP | 2013-527461 A | 6/2013 |
| JP | 2013-174488 A | 9/2013 |
| JP | 2018-205046 A | 12/2018 |
| JP | 2019-505773 A | 2/2019 |

OTHER PUBLICATIONS

International Search Report of PCT/JP2020/026012 dated Sep. 24, 2020.
Translation of the International Preliminary Report on Patentability dated Jan. 6, 2022, received in corresponding International Application No. PCT/JP2020/026012.

* cited by examiner

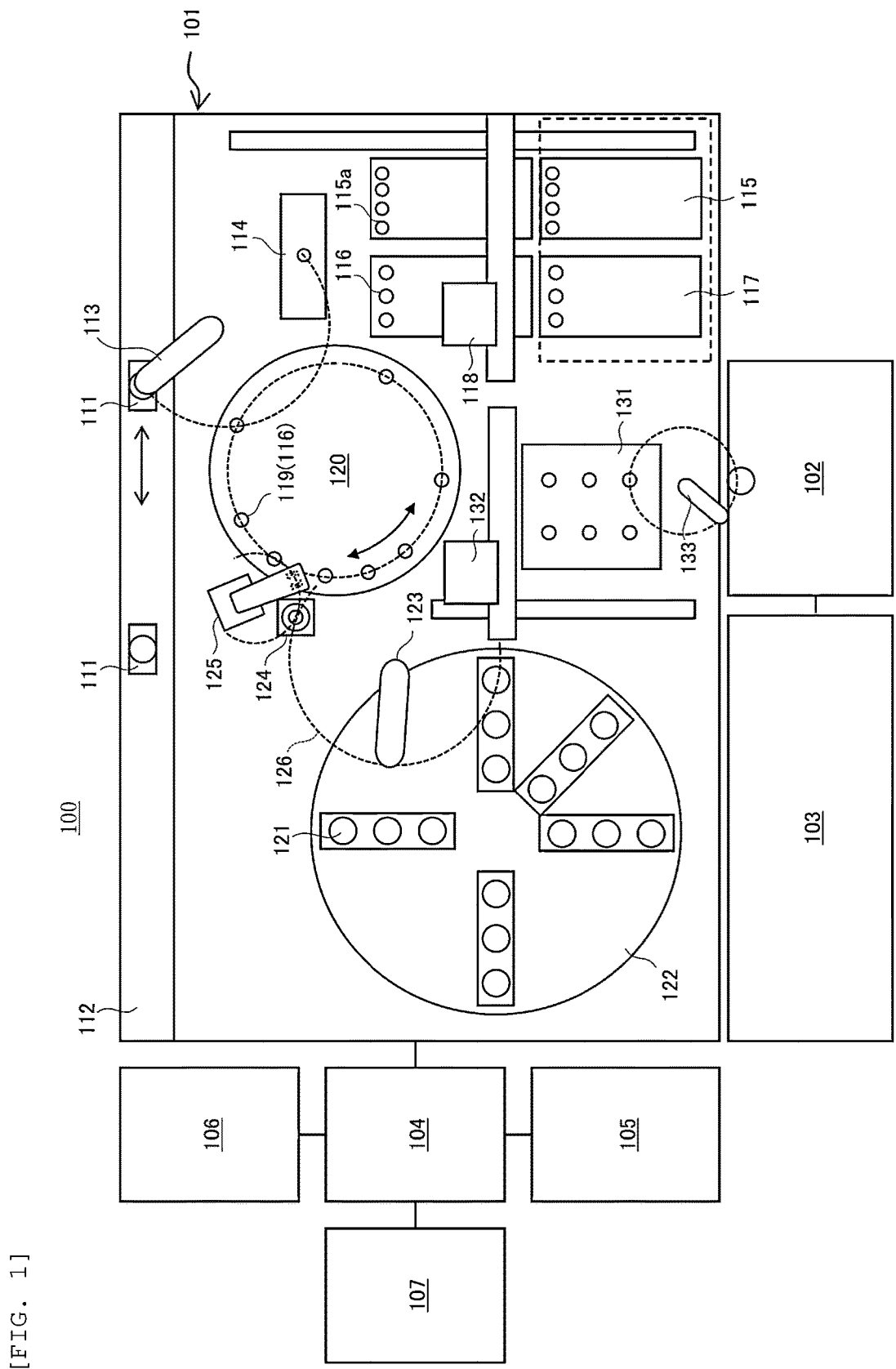
[FIG. 1]

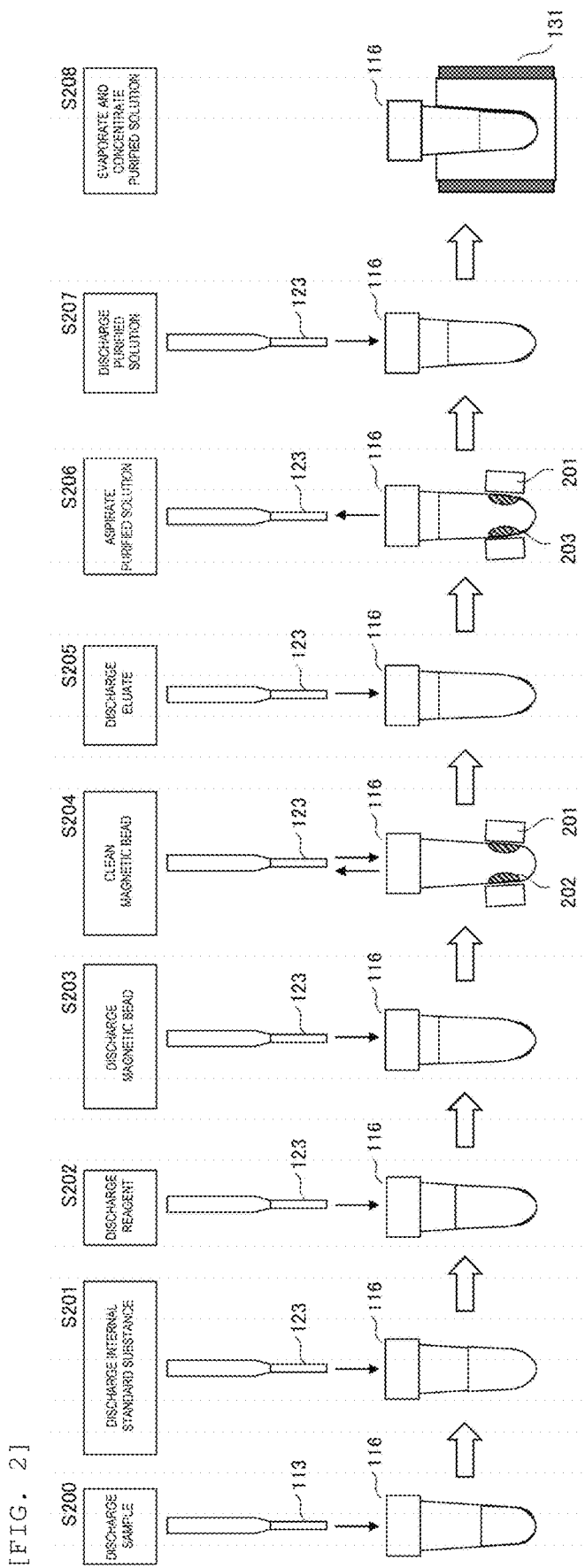
[FIG. 2]

[FIG. 3]
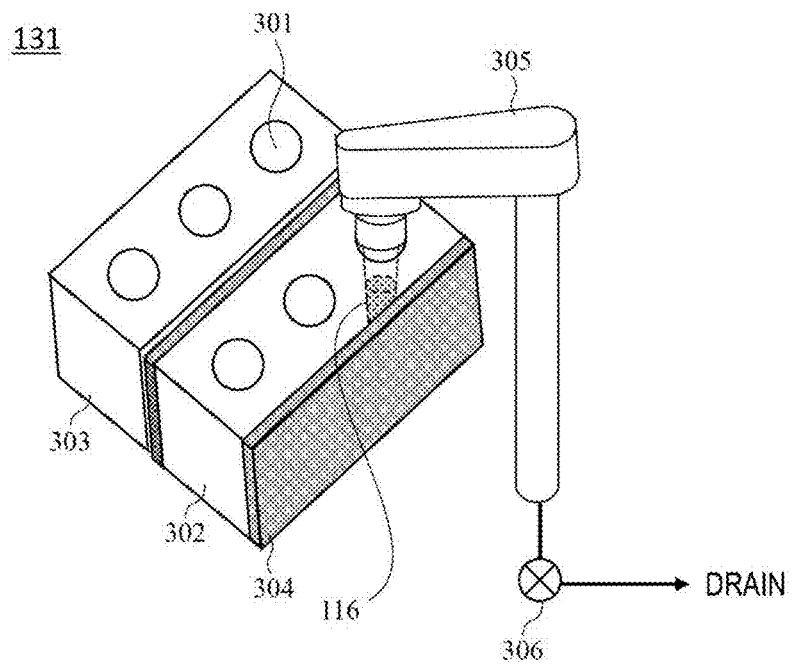
[FIG. 4]
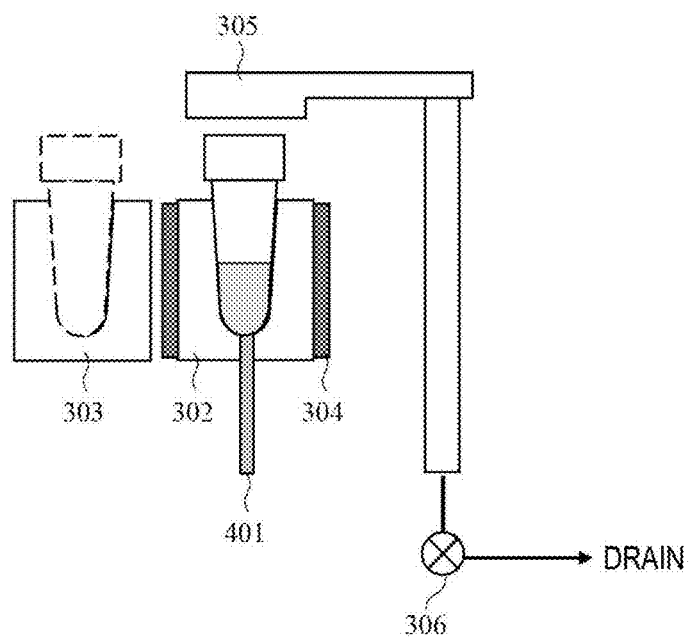

[FIG. 5]
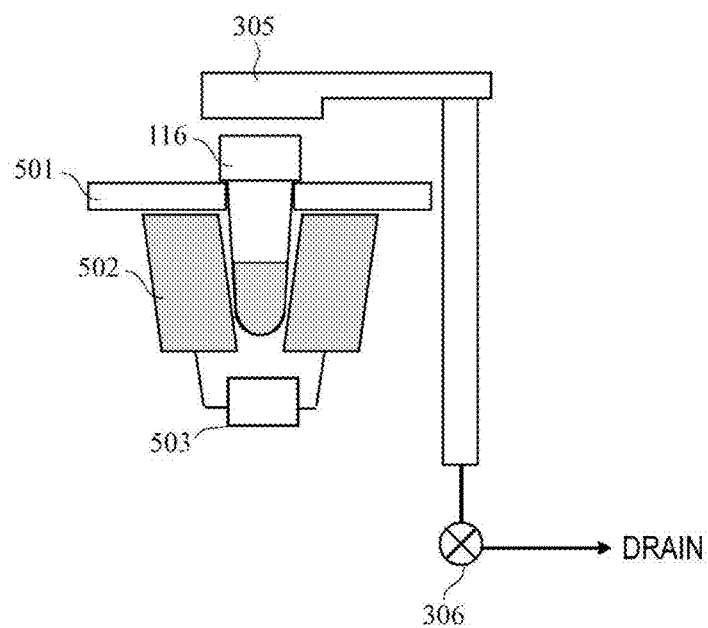
[FIG. 6]
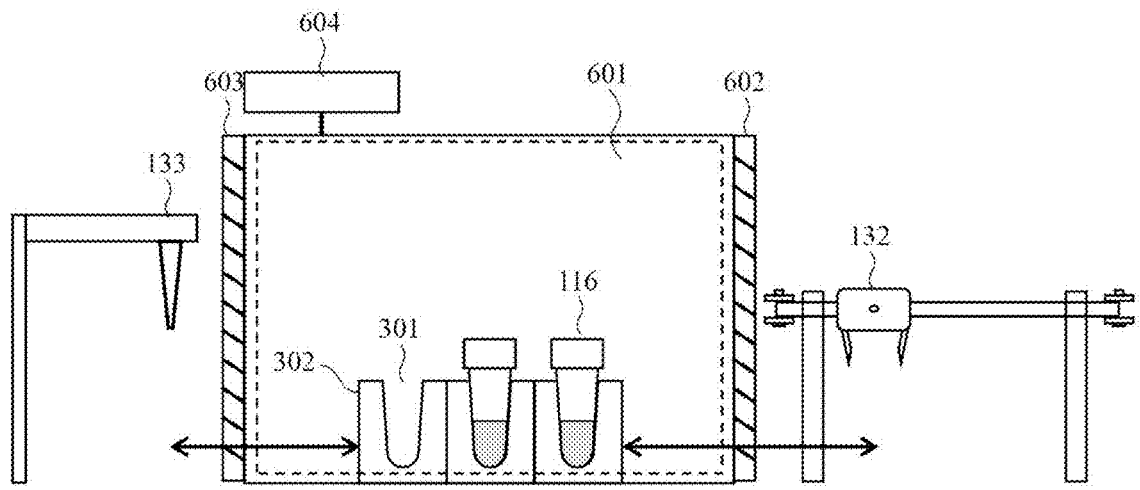

[FIG. 7]
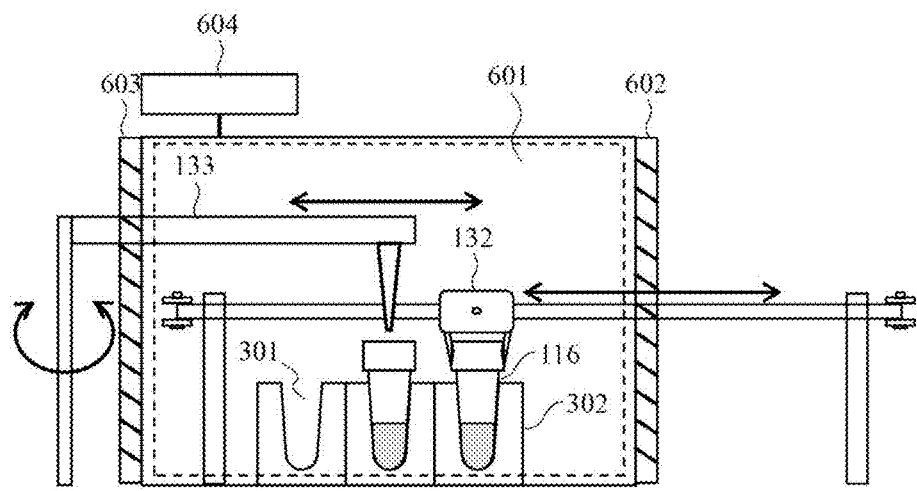
[FIG. 8]
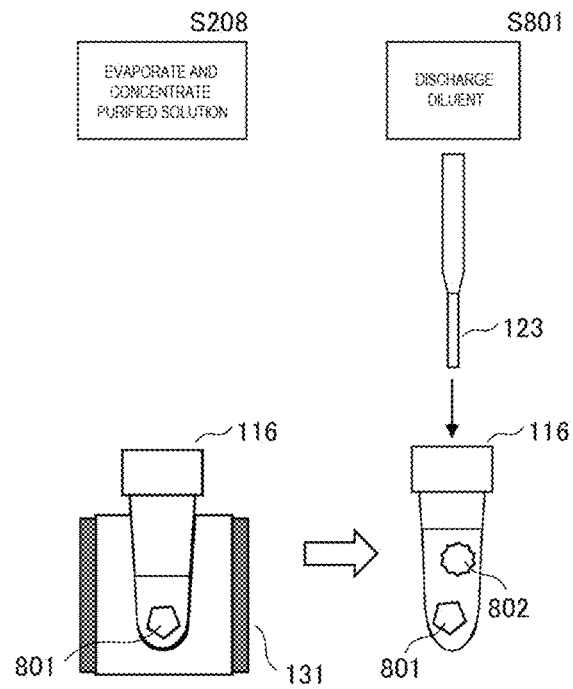

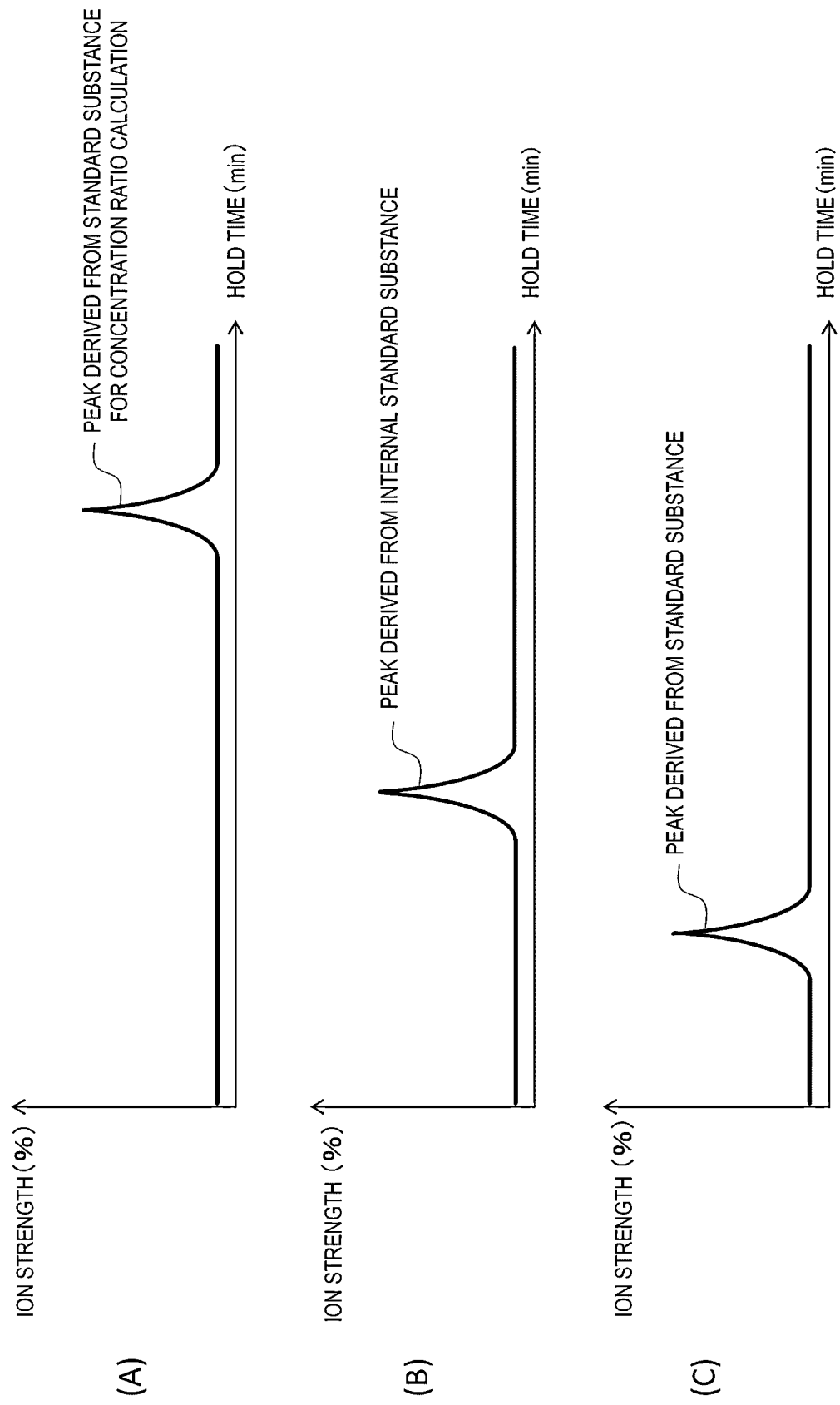

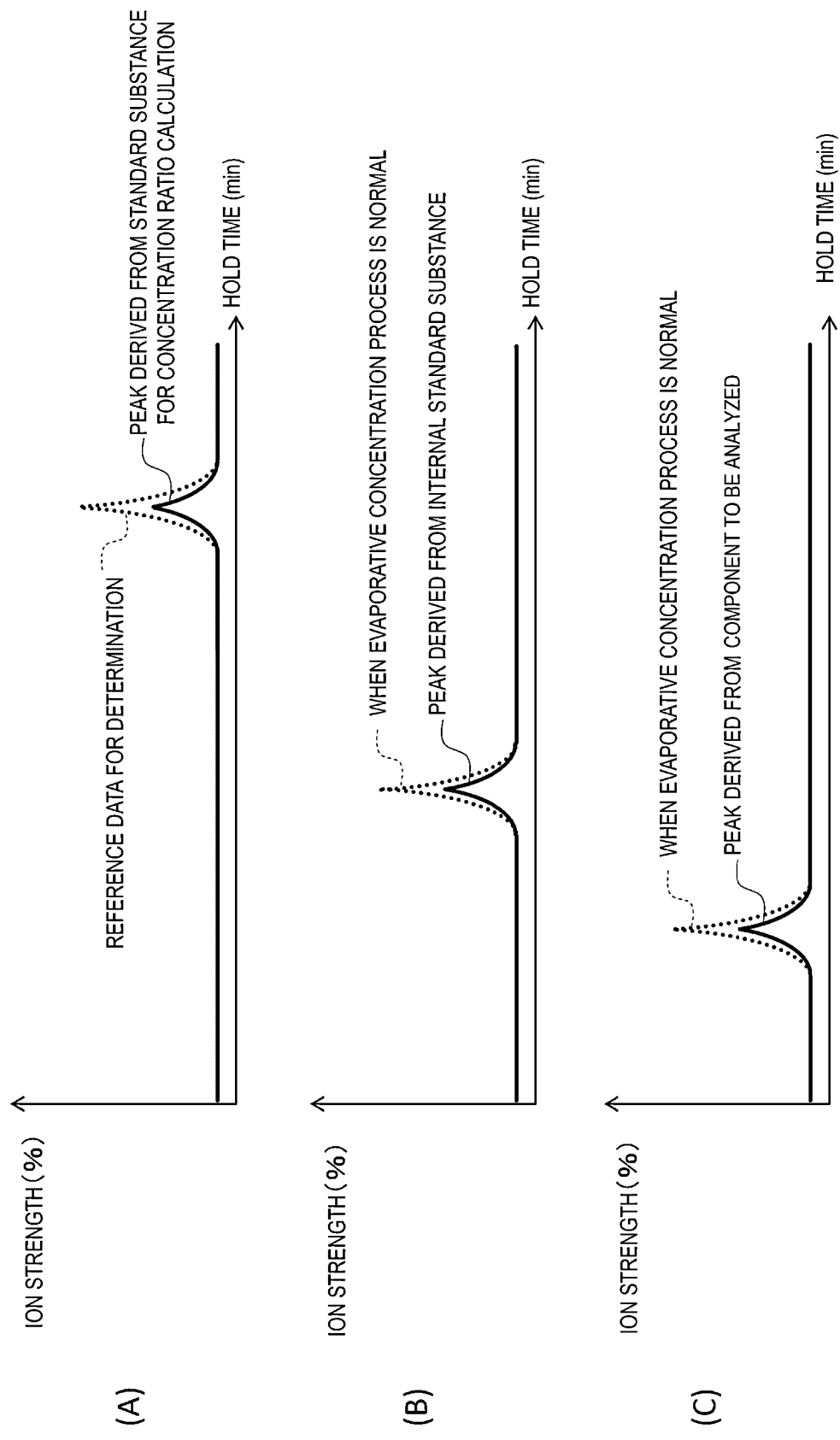

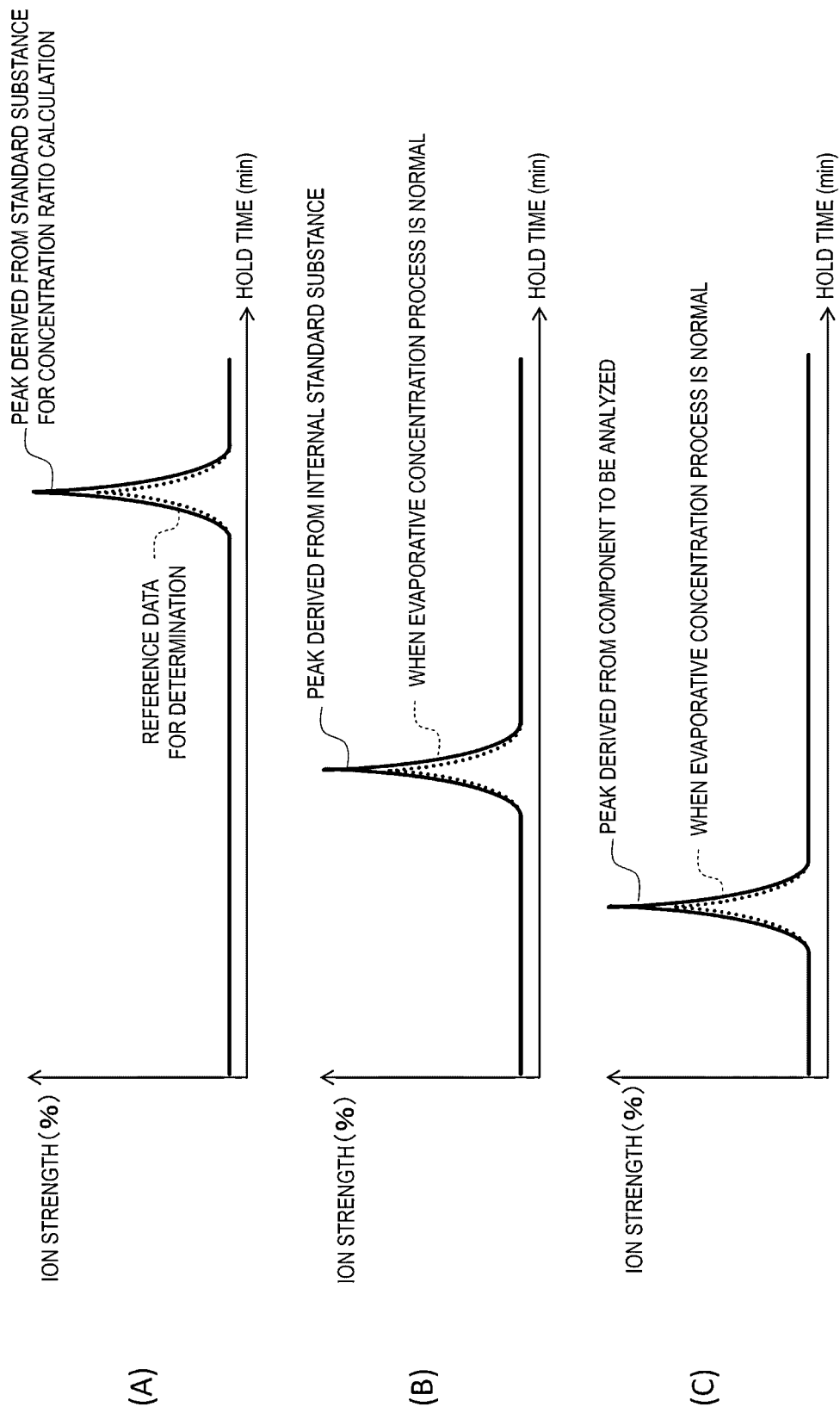

AUTOMATIC ANALYSIS DEVICE

TECHNICAL FIELD

The present invention relates to an automatic analysis device for analyzing a sample.

BACKGROUND ART

Examples of a method for analyzing a specific component contained in a sample include a method using LC-MS in which liquid chromatography (LC) and mass spectrometry (MS) are connected online.

The use of the LC-MS is also expanding to a field of clinical tests in which a biological sample such as blood and urine is analyzed by an automatic analysis device.

When a biological sample such as blood or urine (hereinafter, simply referred to as a sample) is analyzed using the LC-MS, it is necessary to perform a pre-processing for increasing a degree of purification of the sample. Examples of the pre-processing of the sample include methods such as solid phase extraction (SPE), and liquid-liquid extraction (LLE).

In particular, since SPE can be easily connected to the LC-MS online, a pre-processing using SPE and an analysis using the LC-MS can be integrally automated.

In the pre-processing of the sample, in order to implement high-sensitivity detection using the LC-MS, an evaporative concentration may be performed in which an extract solution obtained by extracting a component to be analyzed that is contained in the sample is evaporated to increase a concentration of the component to be analyzed.

As a technique of performing such an evaporative concentration of a sample, for example, PTL 1 discloses a device for automatically executing an evaporation process of a sample solution by inserting a container containing a sample into a holder including a heating wire and a heating coil.

CITATION LIST

Patent Literature

PTL 1: JP-T-2013-527461

SUMMARY OF INVENTION

Technical Problem

In such an automatic pre-processing device in the related art as described above, automation of a process by batch processing is assumed.

In the batch processing, since a reaction solution is processed in a batch, it is not possible to select whether to perform a concentration on each sample.

However, in an automatic analysis device for clinical tests of continuously processing various samples, the number of components to be analyzed, which requires detection in a low concentration region for which an evaporative concentration is unnecessary, is limited, and therefore, it is desirable that the automatic analysis device includes a mechanism capable of selecting whether to perform the evaporative concentration on each sample and controls the mechanism, and the high-sensitivity detection is enabled.

The invention has been made in view of the above circumstances, and an object of the invention is to provide an automatic analysis device capable of selecting whether to perform an evaporative concentration on each sample and controlling an evaporative concentration of a sample.

Solution to Problem

In order to achieve the above object, the invention is configured as follows.

An automatic analysis device includes: an evaporative concentration unit configured to perform a concentration process of evaporating an extract solution obtained by extracting a component to be analyzed in a sample to concentrate the component to be analyzed; an analysis unit configured to analyze the component to be analyzed of the sample; and a control unit configured to control operations of the analysis unit and the evaporative concentration unit.

The control unit determines whether to perform an evaporative concentration process on a component to be analyzed in the sample, and controls the evaporative concentration unit to concentrate a component to be analyzed in a sample which is determined to be subjected to an evaporative concentration process.

BRIEF DESCRIPTION OF DRAWINGS

FIG. 1 is a diagram schematically showing an overall configuration of an automatic analysis device according to a first embodiment of the invention.

FIG. 2 is a diagram showing an example of a pre-processing process of an analysis process performed by the automatic analysis device.

FIG. 3 is a diagram schematically showing an example of an evaporative concentration mechanism according to the first embodiment of the invention.

FIG. 4 is a diagram showing an ejector pin for pushing up a reaction vessel from below.

FIG. 5 is a diagram schematically showing an example of an evaporative concentration mechanism in a second embodiment.

FIG. 6 is a diagram showing a third embodiment and schematically showing an example in which an evaporative concentration unit is provided in one area including an exhaust unit.

FIG. 7 is a diagram showing a modification of the example shown in FIG. 6.

FIG. 8 is a diagram showing an example of a process of a concentration ratio calculation for a purified solution obtained by the pre-processing process.

FIG. 9 is a diagram showing a case in which mass chromatograms derived respectively from a standard substance for the concentration ratio calculation, an internal standard substance and a standard substance are compared.

FIG. 10 is a diagram showing a case in which mass chromatograms derived respectively from the standard substance for the concentration ratio calculation, the internal standard substance and the standard substance are compared.

FIG. 11 is a diagram showing a case in which mass chromatograms derived respectively from the standard substance for the concentration ratio calculation, the internal standard substance and the standard substance are compared.

DESCRIPTION OF EMBODIMENTS

Hereinafter, embodiments of the invention will be described with reference to the drawings. In the embodiments of the invention, an automatic analysis device obtained by combining Liquid Chromatography-Mass Spectrometry (LC-MS), serving as an analysis mechanism, with a pre-processing function of a sample is described as an example, and the invention can also be applied to, for example, an automatic analysis device obtained by combining a separation unit such as a capillary electrophoresis device and a detector such as an absorption photometer as an analysis mechanism.

EMBODIMENTS

First Embodiment

FIG. 1 is a diagram schematically showing an overall configuration of an automatic analysis device according to a first embodiment of the invention.

In FIG. 1, an automatic analysis device 100 includes a pre-processing unit 101 for performing pre-processing of a sample, a separation unit 102 which separates components in the sample, an analysis unit 103 which analyzes the separated components, a control unit 104 for controlling an operation of the entire device, an input unit 105 for a user to input information to the device, a display unit 106 for displaying information to the user, and a storage unit 107 such as a storage medium which stores various pieces of information related to control of the automatic analysis device 100.

The control unit 104, the input unit 105, the display unit 106, and the storage unit 107 constitute a control device which controls the operation of the entire automatic analysis device 100.

In the first embodiment, although the input unit 105 and the display unit 106 are shown as separate units, the input unit 105 and the display unit 106 may be integrally configured like a touch panel type monitor, for example.

The pre-processing unit 101 includes a transport mechanism 112 which transports a sample container 111 accommodating a sample to be analyzed to a sample dispensing position, a reaction vessel disk 120 capable of holding a solution in a reaction vessel 116 at a predetermined temperature when the reaction vessel 116 is mounted on a plurality of opening parts 119, a reagent disk 122 which holds a plurality of reagent containers 121 accommodating reagents, and a sample dispensing mechanism 113 which dispenses a sample from the sample container 111 transported to the sample dispensing position to the reaction vessel 116 accommodated in the opening part 119 of the reaction vessel disk 120.

The pre-processing unit 101 further includes a reagent dispensing mechanism 123 which dispenses a reagent from a reagent container 121 to the reaction vessel 116 in the reaction vessel disk 120, a dispensing tip mounting rack 115 on which an unused dispensing tip 115a which is a disposable dispensing tip to be mounted on a nozzle of the sample dispensing mechanism 113 is mounted, and a dispensing tip attaching/detaching unit 114 which removes and discards a used dispensing tip 115a from the nozzle of the sample dispensing mechanism 113 or mounts an unused dispensing tip 115a on the nozzle.

The pre-processing unit 101 still further includes a reaction vessel mounting rack 117 on which an unused reaction vessel 116 is mounted, and a transport mechanism 118 which transports an unused dispensing tip 115a from the dispensing tip mounting rack 115 to the dispensing tip attaching/detaching unit 114, transports a used reaction vessel 116 from the opening part 119 of the reaction vessel disk 120 to a discarding unit (not shown), and transports the unused reaction vessel 116 from the reaction vessel mounting rack 117 to the opening part 119 of the reaction vessel disk 120.

The pre-processing unit 101 also includes a magnetic separation mechanism 124 which separates magnetic beads in the solution accommodated in the reaction vessel 116 by a magnetic force of a magnet, a transport mechanism 125 which transports the reaction vessel 116 between the reaction vessel disk 120 and the magnetic separation mechanism 124, and an evaporative concentration mechanism 131 which evaporates and concentrates a component to be analyzed in the solution in the reaction vessel 116.

The pre-processing unit 101 furthermore includes a transport mechanism 132 which transports the reaction vessel 116 between the reaction vessel disk 120 and the evaporative concentration mechanism 131, a dispensing mechanism 133 for the separation unit, which dispenses the solution in the reaction vessel 116 after the evaporative concentration to the separation unit 102 which separates components in a sample, and the analysis unit 103 which detects and analyzes the components in the solution separated by the separation unit 102.

The magnetic separation mechanism 124 is provided on a rotation track 126 of the reagent dispensing mechanism 123. The reagent dispensing mechanism 123 can discharge the reagent to the reaction vessel 116 supported by the magnetic separation mechanism 124 and aspirate the solution in the reaction vessel 116.

The reaction vessel disk 120 functions as an incubator which keeps a temperature of the reaction vessel 116 installed at the opening part 119 constant, and incubates the reaction vessel 116 installed at the opening part 119 for a predetermined period of time.

The separation unit 102 is, for example, a liquid chromatography (LC), and includes a column or the like having a function of separating the components in the reaction solution dispensed by the dispensing mechanism 133 for the separation unit. The separation unit 102 separates the components in the reaction solution dispensed from the reaction vessel 116 by the dispensing mechanism 133 for the separation unit, and sequentially introduces the separated components into the analysis unit 103.

The analysis unit 103 is, for example, a mass spectrometry (MS), and includes an electron multiplier tube or the like having a function of ionizing and mass analyzing the components introduced from the separation unit 102. The analysis unit 103 ionizes the components introduced from the separation unit 102 and detects an amount of ions (that is, an amount of components), and outputs a detection result to the control unit 104.

The control unit 104 controls an operation of the evaporative concentration mechanism (evaporative concentration unit) 131, an operation of the separation unit 102, and an operation of the analysis unit 103. The control unit 104 calculates a concentration value of the components in the sample using the detection result (the amount of ions) from the analysis unit 103 and a calibration curve acquired in advance, stores the concentration value in the storage unit 107 as an analysis result, and displays the analysis result on the display unit 106.

As a method of acquiring the calibration curve, for example, first, a standard substance having a known concentration is analyzed under a plurality of concentrations. Then, a temporal change of an amount of ions, that is, an ion strength with respect to an m/z (mass/charge ratio) of ions derived from the standard substance (mass chromatogram) is acquired, and a peak area of the mass chromatogram is calculated. The calibration curve is created from a relation between the area and the concentration of the standard substance.

By using the calibration curve acquired in this manner, it is possible to detect a component concentration of a sample with an unknown concentration, which has the same component to be analyzed as the standard substance.

Specifically, the peak area of the mass chromatogram of the sample to be analyzed is calculated, and the component concentration of the component to be analyzed is determined based on a correspondence between the peak area of the mass chromatogram and the calibration curve.

When intensities of the detected ions are normalized based on intensities of ions derived from the internal standard substance, comparisons between data can be performed with high accuracy. That is, the ion strength, which may vary slightly in each analysis due to influences of the pre-processing of the sample, an injection of the sample into the LC-MS, the ionization in the LC-MS, and the like, can be compared and verified among analyses. This method is referred to as an internal standard method.

Here, first, a basic process of an analysis process will be described.

FIG. 2 is a diagram showing an example of a pre-processing process of the analysis process performed by the automatic analysis device.

Prior to starting the pre-processing, an unused reaction vessel 116 is transported to the opening part 119 on the reaction vessel disk 120 from the reaction vessel mounting rack 117 by the transport mechanism 118. Prior to dispensing the sample, the sample dispensing mechanism 113 is accessed to the dispensing tip attaching/detaching unit 114, and the dispensing tip 115a is attached to a tip of the nozzle.

In the pre-processing, first, the sample dispensing mechanism 113 aspirates a sample containing the component to be analyzed from the sample container 111 via the dispensing tip 115a, and discharges the sample to the reaction vessel 116 in the reaction vessel disk 120 (step S200).

When dispensing of the sample from one sample container 111 is completed by the sample dispensing mechanism 113, the dispensing tip attaching/detaching unit 114 discards the used dispensing tip 115a, and mounts an unused dispensing tip 115a.

Subsequently, the reagent dispensing mechanism 123 aspirates the internal standard substance as a reagent corresponding to the component to be analyzed from a reagent container 121 of the reagent disk 122, and discharges the internal standard substance to the reaction vessel 116 (step S201).

Subsequently, the reagent dispensing mechanism 123 aspirates, for example, a reagent serving as a deproteinizing agent from a reagent container 121 of the reagent disk 122, and discharges the reagent to the reaction vessel 116 (step S202).

Subsequently, the reagent dispensing mechanism 123 aspirates a suspension of the magnetic beads, which serves as a reagent, from a reagent container 121 of the reagent disk 122 and discharges the suspension to the reaction vessel 116 (step S203).

Subsequently, the reaction vessel 116 into which the sample, the internal standard substance, and the magnetic beads are dispensed is transported to the magnetic separation mechanism 124 by the transport mechanism 125, and the magnetic beads are cleaned (step S204). In the magnetic separation mechanism 124, the magnetic beads holding the component to be analyzed and the internal standard substance are collected at an inner wall surface of the reaction vessel 116 by a magnetic force of a magnet 201 disposed at a position along an outer side surface of the reaction vessel 116 (shown as a magnetic bead group 202 in FIG. 2). In this state, the solution in the reaction vessel 116 is aspirated and discarded by the reagent dispensing mechanism 123.

At this time, the magnetic beads, the component to be analyzed and the internal standard substance which are held by the magnetic beads, remain in the reaction vessel 116.

Subsequently, the reagent dispensing mechanism 123 aspirates, from a reagent container 121 of the reagent disk 122, a cleaning solution for cleaning foreign substances other than the substances held in the magnetic beads (the component to be analyzed and the internal standard substance), and discharges the cleaning solution to the reaction vessel 116.

At this time, a constraint due to the magnetic force of the magnet 201 on the magnetic beads may be temporarily released.

Subsequently, in a state in which the magnetic beads are collected again at the inner wall surface of the reaction vessel 116 by the magnet 201, the reagent dispensing mechanism 123 aspirates and discards a solution (cleaning solution) in the reaction vessel 116, thereby cleaning the magnetic beads.

Subsequently, the reagent dispensing mechanism 123 aspirates an eluate serving as a reagent, which elutes the component to be analyzed and the internal standard substance from the magnetic bead group 202, from a reagent container 121 of the reagent disk 122, and discharges the eluate to the reaction vessel 116 (step S205).

Subsequently, in a state in which a magnetic bead group 203 in which the component to be analyzed and the internal standard substance are eluted is collected at the inner wall surface of the reaction vessel 116 by the magnetic force of the magnet 201, a solution (purified solution) in the reaction vessel 116 is aspirated by the reagent dispensing mechanism 123 (step S206), and is discharged to an unused reaction vessel 116 in the reaction vessel disk 120 different from the reaction vessel 116 disposed at the magnetic separation mechanism 124 (step S207).

The purified solution accommodated in the reaction vessel 116 in the reaction vessel disk 120 is incubated as necessary.

Subsequently, the reaction vessel 116 in which the purified solution is accommodated is transported to the evaporative concentration mechanism 131 by the transport mechanism 132, and the components in the purified solution are evaporated and concentrated (step S208). A detailed configuration of the evaporative concentration mechanism 131 will be described later.

Subsequently, when a composition of the purified solution is changed so that the component to be analyzed is bound to a separation column (not shown) included in the separation unit 102, the reagent dispensing mechanism 123 aspirates a diluent from a reagent container 121 of the reagent disk 122 and discharges the diluent to the reaction vessel 116.

The purified solution obtained by the pre-processing step described above is aspirated from the reaction vessel 116 by the dispensing mechanism 133 for the separation unit and discharged to the separation unit 102, and the components separated by the separation unit 102 are ionized by the analysis unit 103 to detect the amount of ions (that is, the amount of components). The detection result in the analysis unit 103 is output to the control unit 104, and the concentration value of the components in the sample is calculated using the calibration curve.

Subsequently, the evaporative concentration process in the first embodiment of the invention will be described. The automatic analysis device according to the first embodiment includes the evaporative concentration mechanism capable of selecting whether to perform the evaporative concentration on each component to be analyzed, that is, each sample, and a control method thereof. For example, an identification number is assigned to each sample, and which identification number sample is to be subjected to the evaporative concentration process is stored in the storage unit 107 via the input unit 105, and the control unit 104 selects whether to perform the evaporative concentration on each sample based on the content stored in the storage unit 107, and processing of the sample is executed. That is, the control unit 104 determines whether to perform the evaporative concentration process on the component to be analyzed in the sample, and controls the evaporative concentration mechanism 131 (evaporative concentration unit) to concentrate the component to be analyzed in the sample which is determined to be subjected to the evaporative concentration process.

FIG. 3 is a diagram schematically showing an example of the evaporative concentration mechanism 131 according to the first embodiment of the invention.

In FIG. 3, the evaporative concentration mechanism 131 includes a plurality of container receiving units 301 which receives the reaction vessels 116 in which the purified solution obtained by the above-described pre-processing process is accommodated, and distributes each of the reaction vessels 116 transported to the container receiving units 301 to either a container receiving unit 301 of an evaporative concentration unit 302 which performs the evaporative concentration or a container receiving unit 301 of the standby unit 303 which does not perform the evaporative concentration.

Here, the evaporative concentration mechanism 131 includes a heating unit 304 for heating the reaction vessel 116 and an exhaust unit 305 for aspirating vapor in the reaction vessel 116. Examples of the heating unit 304 include a Peltier element or a heater whose temperature can be controlled by the analysis device.

Examples of the exhaust unit 305 include a vacuum pump or the like whose operation can be controlled by the analysis device. A valve 306 may be provided between an opening part of the exhaust unit 305 and a drain.

As a method of distributing the reaction vessel 116 to either the container receiving unit 301 of the standby unit 303 or the container receiving unit 301 of the evaporative concentration unit 302, two examples will be described below.

A first example is a method of making the evaporative concentration mechanism 131 movable. First, the control unit 104 moves the evaporative concentration mechanism 131 such that a point at which the transport mechanism 132 accesses the evaporative concentration mechanism 131 coincides with the container receiving unit 301.

With respect to a sample which is determined by the control unit 104 not to be subjected to the evaporative concentration, the reaction vessel 116 is transported to the container receiving unit 301 on the standby unit 303 by the transport mechanism 132, and after waiting for a predetermined period of time, the purified solution is introduced into the separation unit 102 by the dispensing mechanism 133 for the separation unit.

When the evaporative concentration is performed, the reaction vessel 116 is transported to the container receiving unit 301 on the evaporative concentration unit 302 by the transport mechanism 132. At this time, the exhaust unit 305 is disposed at a position (first position) separated by a predetermined distance or more from the heating unit 304, which is near the heating unit 304 of the evaporative concentration unit 302. Next, the exhaust unit 305 is moved to be disposed at a position which is an upper portion of the reaction vessel 116 disposed at the heating unit 304 and is in close contact with the reaction vessel 116 (a position which is in close contact with the heating unit 304: a second position). In this case, the evaporative concentration mechanism 131 may be moved. Then, exhaust is performed for a predetermined period of time in a state in which the reaction vessel 116 is heated by the heating unit 304 and a state in which the valve 306 is opened, and thereby, the sample is evaporated and concentrated.

In order to increase an evaporation efficiency, it is more preferable to bring the opening part of the reaction vessel 116 into close contact with the exhaust unit 305 by raising the evaporative concentration unit 302 with respect to the exhaust unit 305 or lowering the exhaust unit 305 with respect to the reaction vessel 116.

However, in either case, there is a possibility that the reaction vessel 116 may not come off, due to the close contact between the reaction vessel 116 and the container receiving unit 301, when the reaction vessel 116 is removed from the container receiving unit 301. As a countermeasure, an ejector pin 401 for pushing up the reaction vessel 116 from below may be provided as shown in FIG. 4. Since the ejector pin 401 is configured to move up and down at the same time as the exhaust unit 305, it is possible to reduce the number of driving units such as motors.

A second example is a method of fixing a providing position of the evaporative concentration mechanism 131. In this case, the control unit 104 controls the transport mechanism 132 to transport the reaction vessel 116 to the container receiving unit 301 of the evaporative concentration unit 302 or the standby unit 303 depending on whether to perform the evaporative concentration on the sample. Thereafter, the exhaust unit 305 is moved with respect to the reaction vessel 116 on the evaporative concentration unit 302 such that the exhaust unit 305 is located at the upper portion of the reaction vessel 116.

Then, heating and exhaust are performed with respect to the reaction vessel 116 for a predetermined period of time, and thereby, the sample is evaporated and concentrated. Then, the purified solution in the reaction vessel 116 is introduced into the separation unit 102 by the dispensing mechanism 133 for the separation unit, which is capable of accessing the container receiving unit 301 of the evaporative concentration mechanism 131.

The number of container receiving units 301 in FIG. 3 is an example, and can be changed in consideration of the number of specimens which can be processed per hour, that is, throughput, time required for the evaporative concentration, and the like, which are set in the automatic analysis device. When the throughput is set to 100 specimens/hour (36 seconds/specimen) and the time required for the evaporative concentration is set to 108 seconds (36 seconds×3), and the evaporative concentration unit 302 and the standby unit 303 are respectively provided with three container receiving units 301, the evaporative concentration mechanism 131 can sequentially process the reaction vessel 116 without a free time even when the same process is continuously performed, and the throughput of 100 specimens/hour can be achieved. In this case, the exhaust unit 305 is required for each of the three container receiving units 301 in the evaporative concentration unit 302.

When the reaction vessel 116 and the exhaust unit 305 are brought into close contact with each other to perform the exhaust, the valve 306 is opened during the aspiration of the vapor and the valve 306 is closed after the aspiration is completed, so that the reaction vessel 116 can be prevented from being separated from the exhaust unit 116.

After the aspiration of the vapor performed by the exhaust unit 305 is completed, condensed steam may drip from the exhaust unit 305.

As a countermeasure, the exhaust unit 305 itself may be heated. There is also a countermeasure that after the exhaust is completed and the exhaust unit 305 is separated from the reaction vessel 116, idle aspiration by the exhaust unit 305 is performed.

As described above, according to the first embodiment of the invention, the sample which requires the evaporative concentration process is moved to the evaporative concentration unit 302, and the sample which does not require the evaporative concentration process is moved to the standby unit 303 in which the evaporative concentration process is not performed. In addition, the sample which requires the evaporative concentration process is subjected to the evaporative concentration process by the evaporative concentration unit 302 and moved to the separation unit 102 together with the sample which does not require the evaporative concentration process. Then, in the separation unit 102, the separated components are moved to the analysis unit 103 and analyzed.

Therefore, it is possible to provide the automatic analysis device capable of selecting whether to perform the evaporative concentration on each sample and capable of controlling the evaporative concentration of the sample.

In the example shown in FIG. 3, the standby unit 303 and the evaporative concentration unit 302 are adjacent to each other, but the standby unit 303 may be formed of a heat insulating material so that an influence of heat from the evaporative concentration unit 302 can be reduced. The standby unit 303 and the evaporative concentration unit 302 may be disposed apart from each other so that the standby unit 303 is not thermally affected.

Second Embodiment

Next, a second embodiment of the invention will be described.

The second embodiment is different from the first embodiment in a configuration of the evaporative concentration mechanism, and other configurations are the same as those of the first embodiment. Therefore, illustration and detailed descriptions of portions other than the evaporative concentration mechanism are omitted.

FIG. 5 is a diagram schematically showing an example of the evaporative concentration mechanism 131 in the second embodiment.

In FIG. 5, the evaporative concentration mechanism 131 includes a container support unit 501 which receives and supports the reaction vessel 116 accommodating the purified solution obtained by the pre-processing process described above, and controls whether to perform the evaporative concentration on each reaction vessel 116 transported to the container support unit 501.

Here, the evaporative concentration mechanism 131 in the second embodiment includes a heating unit 502 for heating the reaction vessel 116, a movable unit 503 which controls contact/non-contact of the heating unit 502 with the reaction vessel 116, the exhaust unit 305 for aspirating vapor in the reaction vessel 116, and the valve 306 provided between the opening part of the exhaust unit 305 and the drain.

First, the reaction vessel 116 is transported to the container support unit 501 of the evaporative concentration mechanism 131 by the transport mechanism 132. When the evaporative concentration is not performed, the heating unit 502 is located at a non-heating position where the heating unit 502 is not in contact with the reaction vessel 116 and an extract solution in the reaction vessel 116 is not heated. When the evaporative concentration is performed, the heating unit 502 is moved by the movable unit 503 in a direction approaching the reaction vessel 116 and moved to a position (heating position) where the heating unit 502 is brought into contact with the reaction vessel 116, and heats the extract solution in the reaction vessel 116.

Then, the exhaust unit 305 is moved to the upper portion of the reaction vessel 116 to perform the exhaust for a predetermined period of time in states in which heating is performed and the valve 306 is opened.

When the purified solution in the reaction vessel 116 is not subjected to the evaporative concentration, the movable unit 503 maintains a state in which the heating unit 502 is separated from the reaction vessel 116 by a regular interval or more, and maintains a state, in which the reaction vessel 116 and the heating unit 502 are not in contact with each other, for a predetermined period of time.

Then, after a predetermined period of time has elapsed, the purified solution in the reaction vessel 116 is introduced into the separation unit 102 by the dispensing mechanism 133 for the separation unit.

As shown in FIG. 5, by moving the heating unit 502 without providing the standby unit separately from the evaporating unit as in the first embodiment, contact and non-contact with the reaction vessel 116 is performed, and it is possible to sort out whether to perform the evaporative concentration for each reaction vessel 116.

According to the second embodiment of the invention, the same effects as those of the first embodiment can be attained, and the contact between the heating unit 502 and the reaction vessel 16 can be released by the movable unit 503, and therefore there is no need to consider providing the ejector pin as shown in FIG. 4.

In the second embodiment, since the standby unit of the reaction vessel is not required, a size of the evaporative concentration mechanism 131 can be reduced.

Third Embodiment

Next, a third embodiment of the invention will be described.

The third embodiment is different from the first embodiment in the configuration of the evaporative concentration mechanism, and other configurations are the same as those of the first embodiment. Therefore, illustration and detailed descriptions of portions other than the evaporative concentration mechanism are omitted.

In the third embodiment, by installing the evaporative concentration unit 302 in one area of the exhaust unit, it is possible to perform the evaporative concentration on a plurality of reaction vessels 116 for one time.

FIG. 6 is a diagram showing the third embodiment and schematically showing an example in which the evaporative concentration unit 302 is installed in one area of the exhaust unit. FIG. 7 is a diagram showing a modification of the example shown in FIG. 6.

In the third embodiment, in addition to the configurations of the device shown in FIG. 1, an evaporative concentration area 601, opening/closing units 602 and 603 which partition the evaporative concentration area 601 and the pre-processing unit 101, and an exhaust unit 604 are provided. The exhaust unit 604 evacuates an inside of the evaporative concentration area 601.

Examples of the opening/closing units 602 and 603 include a shutter whose opening and closing can be controlled by the automatic analysis device. Examples of the exhaust unit 604 include a vacuum pump or the like whose operation can be controlled by the automatic analysis device.

FIG. 6 shows a method of making the evaporative concentration unit 302 movable.

First, while the opening/closing unit 602 is opened and the evaporative concentration area 601 is opened, the evaporative concentration unit 302 is moved to a point where the transport mechanism 132 can access the container receiving unit 301 in order to receive the reaction vessel 116 to be subjected to the evaporative concentration.

Then, the reaction vessel 116 is carried into the container receiving unit 301 by the transport mechanism 132. If the reaction vessels 116 are continuously carried into the plurality of container receiving units 301, the above operation is repeated.

Subsequently, after the evaporative concentration unit 302 is moved into the evaporative concentration area 601, the opening/closing unit 602 is closed, the evaporative concentration area 601 is closed to outside air, and the exhaust unit 604 is operated.

After the evaporative concentration is performed for a predetermined period of time, the opening/closing unit 603 is opened, and the transport mechanism 132 moves the evaporative concentration unit 302 to a point where the dispensing mechanism 133 for the separation unit can access the reaction vessel 116. Thereafter, the purified solution in the reaction vessel 116 is introduced into the separation unit 102 by the dispensing mechanism 133 for the separation unit.

Next, a modification shown in FIG. 7 will be described. An example shown in FIG. 7 is an example of a method of fixing an installation position of the evaporative concentration unit 302.

First, while the opening/closing unit 602 is opened, the reaction vessel 116 to be subject to the evaporative concentration is carried into the container receiving unit 301 of the evaporative concentration unit 302 by the transport mechanism 132. If the reaction vessels 116 are continuously carried into the plurality of container receiving units 301, the above operation is repeated.

Subsequently, after the opening/closing unit 602 is closed, the exhaust unit 604 is operated. After the evaporative concentration is performed for a predetermined period of time, the opening/closing unit 603 is opened, and the purified solution in the reaction vessel 116 is introduced into the separation unit 102 by the dispensing mechanism 133 for the separation unit.

According to the third embodiment of the invention, the same effects as those of the first embodiment can be attained, and only one exhaust unit 604 may be provided.

Fourth Embodiment

Next, a fourth embodiment of the invention will be described.

First, a basic principle of a concentration ratio calculation process in the fourth embodiment will be described.

The concentration ratio calculation process of the fourth embodiment is a process of calculating a concentration ratio of a sample subjected to the evaporative concentration process or determining whether there is an abnormality in the evaporative concentration process. The determination process of the fourth embodiment is also applicable to any of the first to third embodiments.

In the invention, a sample to be subjected to the evaporative concentration process and a sample not to be subjected to the evaporative concentration process are mixed and continuously processed at a regular cycle (regular interval). Thus, the fourth embodiment is an example in which it is confirmed whether the concentration process is reliably performed and a determination of a case of an abnormality in the concentration is performed so as to ensure reliability.

FIG. 8 is a diagram showing an example of a process of a concentration ratio calculation for the purified solution obtained by the pre-processing process. FIGS. 9 to 11 are diagrams schematically showing an example of mass chromatograms obtained by the analysis unit for each of a standard substance for the concentration ratio calculation, an internal standard substance, a standard substance, and a component to be analyzed, in which a vertical axis represents the ion strength and a horizontal axis represents a LC hold time. (A) of FIG. 9 shows a mass chromatogram derived from the standard substance for the concentration ratio calculation, (B) of FIG. 9 shows a mass chromatogram derived from the internal standard substance, and (C) of FIG. 9 shows a mass chromatogram derived from the standard substance.

In each of FIGS. 10 and 11, (A) is a mass chromatogram derived from the standard substance for the concentration ratio calculation, (B) is a mass chromatogram derived from the internal standard substance, and (C) is a mass chromatogram derived from the component to be analyzed. Each of FIGS. 10 and 11 is a diagram illustrating a comparative example of the mass chromatograms and a determination criterion.

In FIG. 8, first, the reaction vessel 116 in which the purified solution obtained by the above-described pre-processing process is accommodated is transported to the evaporative concentration mechanism 131, and a component 801 to be analyzed in the purified solution is evaporated and concentrated (step S208).

Subsequently, in order to change the composition of the purified solution such that the component 801 to be analyzed is bonded to the separation column included in the separation unit 102, a diluent is aspirated from the reagent container 121 of the reagent disk 122 by the reagent dispensing mechanism 123 and is discharged to the reaction vessel 116 (step S801).

A standard substance 802 for concentration ratio calculation having a predetermined known concentration is added to the reagent container 121 in which the diluent according to the fourth embodiment is accommodated. As the standard substance for the concentration ratio calculation, a substance, which is detected at the same time as the component to be analyzed within a range of the LC hold time in which the component to be analyzed of the sample to be analyzed is detected, is selected.

The standard substance having a known concentration is analyzed in accordance with a step of the analysis process, a mass chromatogram of the standard substance (see FIG. 9 and the like) is acquired in advance, and is recorded in the storage unit 107 as reference data for determination.

Here, when a mass chromatogram is acquired by analyzing the sample to be analyzed in accordance with the step of the analysis process, data (acquired data) including a peak derived from the component to be analyzed of the sample and the internal standard substance is acquired, and data including a peak derived from the standard substance for the concentration ratio calculation in the same range of the LC hold time is acquired (see FIGS. 10 and 11).

When comparing the mass chromatograms derived from the acquired components and substances, the comparison is performed after a data normalization. The data normalization is performed, for example, by comparing peaks at the same hold time and calculating a percentage of the peak area in the acquired data when a size of the peak area in the reference data for determination is 100%.

For example, when the peak area in the acquired data is 97% of the peak area in the reference data for determination, it is determined that there is a difference of 3%. Here, a difference ratio represented by the following Equation (1) is defined as an index indicating a degree of mismatch between the reference data for determination and the acquired data.

$$\text{Difference ratio (\%)} = |1-(\text{acquired data})/(\text{reference data for determination})| \times 100 \quad (1)$$

In an evaporative concentration abnormality determination process of the fourth embodiment, the difference ratio given by the above Equation (1) is compared with a preset difference ratio threshold value, and whether there is an abnormality in the evaporative concentration is determined based on a comparison result. That is, the difference ratio is calculated at the same time as the concentration of the component to be analyzed is calculated, and the difference ratio is compared with the difference ratio threshold value, and thereby, whether there is an abnormality in the evaporative concentration can be temporarily determined. The determination process is executed by the control unit 104.

The difference ratio threshold value serving as the determination reference is preset prior to the analysis process and the evaporative concentration abnormality determination process, and is stored in advance in the storage unit 107 in the same manner as the reference data for determination. The difference ratio threshold value may be input in advance by an operator as appropriate. It is known that a standard measurement error of the LC-MS is about 5 to 10%. Therefore, in the fourth embodiment, a case where the difference ratio threshold value is set to 15% will be described as an example.

That is, when the difference ratio is larger than 15%, it is determined that there is an abnormality in the evaporative concentration. Since it is considered that the measurement error depends on the device, the difference ratio threshold value is set for each device to further increase determination accuracy of an abnormality in the evaporative concentration.

For example, in a case illustrated in (A) of FIG. 10, when the reference data for determination (dotted line) is compared with the acquired data of the peak derived from the standard substance for the concentration ratio calculation, an area of the peak derived from the standard substance for the concentration ratio calculation is smaller in the acquired data during the sample analysis than that in the reference data for determination.

Therefore, when the difference ratio is larger than the difference ratio threshold value (15%), it is determined that there is an abnormality in which an evaporation amount of the purified solution decreases in the evaporative concentration process. This is because, when the evaporation amount decreases, a total amount of the purified solution after the diluent containing the standard substance for the concentration ratio calculation is added becomes larger than that in a normal state, and a concentration of the standard substance for the concentration ratio calculation decreases.

At the same time, as shown in (B) of FIG. 10, concentrations of the component to be analyzed in the purified solution and the internal standard substance decrease and the peak area decreases, so that the concentration of the component to be analyzed is calculated to be small as shown in (C) of FIG. 10.

In this case, a correction may be performed by normalizing the data derived from the component to be analyzed with the data derived from the internal standard substance, or by normalizing the data derived from the component to be analyzed with the data derived from the standard substance for the concentration ratio calculation, based on an internal standard method.

In a case illustrated in (A) of FIG. 11, when the reference data for determination (dotted line) is compared with the acquired data of the peak derived from the standard substance for the concentration ratio calculation, an area of the peak derived from the standard substance for the concentration ratio calculation is larger in the acquired data during the sample analysis than that in the reference data for determination.

Therefore, when the difference ratio is larger than the difference ratio threshold value (15%), it is determined that there is an abnormality in which the evaporation amount of the purified solution increases in the evaporative concentration process. This is because, when the evaporation amount increases, as shown in (B) of FIG. 11, the total amount of the purified solution after the diluent containing the standard substance for the concentration ratio calculation is added becomes smaller than that in the normal state, and the concentration of the standard substance for the concentration ratio calculation increases. At the same time, the concentrations of the component to be analyzed in the purified solution and the internal standard substance increase and the peak area increases, so that the concentration of the component to be analyzed is calculated to be large as shown in (C) of FIG. 11.

In this case, the correction may be performed by normalizing the data derived from the component to be analyzed with the data derived from the internal standard substance, or by normalizing the data derived from the component to be analyzed with the data derived from the standard substance for the concentration ratio calculation, based on the internal standard method.

The control unit 104 determines whether the evaporative concentration process is sufficient, and when the evaporative concentration process is determined to be insufficient, the control unit 104 can control the display unit 106 to display an alarm indicating that the evaporative concentration process is insufficient.

Here, an outline of a method of selecting the standard substance for the concentration ratio calculation will be described.

In the MS, a stable isotope labeled compound of the component to be analyzed or a compound (an analog compound) having chemical and physical properties similar to those of the component to be analyzed is generally used as an internal standard substance.

Therefore, in consideration of this point for the selection of the standard substance for the concentration ratio calculation, a substance which can be captured by the magnetic beads during the pre-processing of the sample and has a peak sufficiently separated from the peaks derived from the component to be analyzed and the internal standard substance in the mass chromatograms, and which is detected within the range of the hold time of the LC for measuring the component to be analyzed is selected as a standard substance for the concentration ratio calculation.

First, chemical properties of a substance selected as the standard substance for the concentration ratio calculation will be discussed.

In the fourth embodiment, the component to be analyzed is captured by hydrophobic interaction with the magnetic beads. In the LC, a reverse-phase column is usually used for the separation column. Holding in the reverse-phase column is basically performed based on the hydrophobic interaction.

Therefore, for example, it is desirable that the standard substance for the concentration ratio calculation has the same degree of hydrophobicity as the component to be analyzed so that the standard substance for the concentration ratio calculation is captured by the magnetic beads and the reverse-phase column. For example, since an ionic compound in a non-dissociated state generally has high hydrophobicity, the ionic compound is also strongly held in a reverse-phase column.

A difference between a dissociated state and the non-dissociated state is caused by a relation between a pH of a mobile phase of the LC and a pKa of the compound. The pKa of the component to be analyzed or the internal standard substance is generally set to a value which is ±2 or more away from the pH of the mobile phase, so that a holding behavior can be stabilized. That is, in consideration of the above description, it is important to select the substance, which has a peak sufficiently separated from the peaks derived from the component to be analyzed and the internal standard substance in the mass chromatograms and which is detected within the range of the hold time of the LC for measuring the component to be analyzed, as the standard substance for the concentration ratio calculation from a balance between the pKa of the component to be analyzed or the internal standard substance and the mobile phase.

Next, a molecular weight of the substance selected as the standard substance for the concentration ratio calculation will be discussed.

When an m/z of the ions derived from the standard substance for the concentration ratio calculation overlaps with an m/z of other detected ions to an extent that the above two m/z cannot be identified by a mass resolution of the MS, a peak strength of the ions derived from the standard substance for the concentration ratio calculation may be erroneously recognized to be increased. In this case, it is difficult to determine whether there is an abnormality in a dispensing amount.

Since a normal MS has a mass resolution of about 1 (m/z), m/z of mass chromatogram peaks derived from the component to be analyzed, the internal standard substance, and the standard substance for the concentration ratio calculation are apart from one another by at least 1 [Da], preferably 3 [Da] or more.

Here, in particular, in order to perform accurate analysis in the analysis of a sample containing a large number of impurity components, such as a biological sample, it is desirable to use, as the MS used as a detector, a device using an MS/MS method capable of detecting product ions. When the MS/MS method is used, m/z of product ions may be different even if m/z of precursor ions of substances are the same.

According to the fourth embodiment of the invention, the reliability can be ensured since the diluent containing the standard substance is added into the extract solution subjected to the concentration process performed by the evaporative concentration unit 131, a signal amount of the standard substance is detected by the analysis unit 103, and a concentration ratio of the extract solution is calculated based on the detected signal amount, and in addition, whether the concentration process is reliably performed is confirmed and the case of an abnormality in the concentration is determined when a sample to be heated and a sample not to be heated are mixed, and the sample to be heated is subjected to the concentration process, and the process is continuously performed in a regular cycle.

The invention configured as described above has the following effects.

In the automatic analysis device which integrally performs the pre-processing and the analysis using LC-MS, automation of a process by batch processing is assumed. In the batch processing, since the reaction solution is processed in a batch, it is not possible to select whether the concentration is performed on each sample. However, in an automatic analysis device for clinical tests which continuously processes various samples, the number of components to be analyzed, which is required to be detected in a low concentration region, is limited, it is desirable that the automatic analysis device includes a mechanism and control capable of selecting whether to perform the evaporative concentration on each sample.

In contrast, the automatic analysis device in the invention includes the evaporative concentration mechanism 131 which performs the evaporative concentration of evaporating the extract solution obtained by extracting the component to be analyzed and preparing a sample solution before the sample solution is introduced into the separation unit 102 (liquid chromatograph). The evaporative concentration mechanism 131 includes the container receiving unit 301 for receiving the reaction vessel 116 in which the extract solution is accommodated, and includes the mechanism and the control method of sorting out whether to perform the evaporative concentration for each reaction vessel 116 reaching the container receiving unit 301, so that the automatic analysis device capable of selecting whether to perform the evaporative concentration on each sample and controlling the evaporative concentration of the sample can be provided.

The invention is not limited to the above-described embodiments and modifications, and includes other various modifications. For example, the above-described embodiments are described in detail for easy understanding of the invention, and are not necessarily limited to those including all the configurations described above.

In the examples described above, an example in which a heating process and an exhaust process are performed in the concentration process is described, but an example in which either one of the heating processing and the exhaust process is performed in the concentration process can also be described as an embodiment of the invention. This is because the concentration process of the sample can be performed only by heating process or the exhaust process.

Each of the above-described configurations, functions, and the like may be implemented by being designed partially or entirely using an integrated circuit or the like. The configurations, functions, and the like described above may be implemented by software by means of a processor interpreting and executing a program for implementing respective functions.

The analysis unit 103 may be, for example, an optical analysis device other than the mass spectrometry device.

REFERENCE SIGN LIST

100 Automatic analysis device
101 Pre-processing unit

102 Separation unit
103 Analysis unit
104 Control unit
105 Input unit
106 Display unit
107 Storage unit
111 Sample container
112 Transport mechanism
113 Sample dispensing mechanism
114 Dispensing tip attaching/detaching unit
115 Dispensing tip mounting rack
115a Dispensing tip
116 Reaction vessel
117 Reaction vessel mounting rack
118 Transport mechanism
119 Opening part
120 Reaction vessel disk
121 Reagent container
122 Reagent disk
123 Reagent dispensing mechanism
124 Magnetic separation mechanism
125 Transport mechanism
126 Rotation track
131 Evaporative concentration mechanism
132 Transport mechanism
133 Dispensing mechanism for separation unit
201 Magnet
202 Magnetic bead group
203 Magnetic bead group
301 Container receiving unit
302 Evaporative concentration unit
303 Standby unit
304 Heating unit
305 Exhaust unit
306 Valve
401 Ejector pin
501 Container support unit
502 Heating unit
503 Movable unit
601 Evaporative concentration area
602 Opening/closing unit
603 Opening/closing unit
604 Exhaust unit
801 Component to be analyzed
802 Standard substance for concentration ratio calculation

The invention claimed is:

1. An automatic analysis device, comprising:
an evaporative concentration unit configured to perform a concentration process of evaporating an extract solution obtained by extracting a component to be analyzed in a sample to concentrate the component to be analyzed;
an analysis unit configured to analyze the component to be analyzed of the sample; and
a control unit configured to control operations of the analysis unit and the evaporative concentration unit, wherein
the control unit is configured to determine whether to perform an evaporative concentration process on a component to be analyzed in the sample, and control the evaporative concentration unit to concentrate a component to be analyzed in a sample which is determined to be subjected to an evaporative concentration process,
the extract solution contains an internal standard substance,
a diluent containing a standard substance for concentration ratio calculation is added to the extract solution subjected to the concentration process performed by the evaporative concentration unit,
the analysis unit is configured to detect signal amounts of the component to be analyzed, the internal standard substance, and the standard substance for concentration ratio calculation, and
the control unit is configured to calculate a concentration ratio of the extract solution based on reference data for determination and the detected signal amounts, the reference data for determination being signal amounts of the internal standard substance and the standard substance for concentration ratio calculation, which are acquired in advance.

2. The automatic analysis device according to claim 1, wherein the evaporative concentration unit includes:
a heating unit configured to heat and evaporate the extract solution; and
an exhaust unit configured to aspirate vapor generated by the heating unit.

3. The automatic analysis device according to claim 2, wherein the evaporative concentration unit further includes a standby unit configured to hold a sample which is determined not to be subjected to an evaporative concentration by the control unit on standby.

4. The automatic analysis device according to claim 2, wherein the exhaust unit is configured to move between a first position separated by a predetermined distance from the heating unit and a second position in close contact with the heating unit, and
wherein the control unit is configured to dispose the exhaust unit on the first position when the evaporative concentration is not performed, and move the exhaust unit to the second position when the evaporative concentration is to be performed.

5. The automatic analysis device according to claim 2, wherein the extract solution is accommodated in a container, and
wherein the heating unit includes a container receiving unit which is configured to receiver the container, and an ejector pin which is configured to push up the container accommodated in the container receiving unit from below.

6. The automatic analysis device according to claim 2, further comprising:
a movable unit, wherein
the extract solution is accommodated in a container, and
the movable unit is configured to move the heating unit between a non-heating position not in contact with the container in which the extract solution in the container is not heated, and a heating position in contact with the container.

7. The automatic analysis device according to claim 2, wherein the heating unit is disposed in an evaporative concentration area and includes an opening/closing unit configured to open and close the evaporative concentration area, and the exhaust unit is configured to evacuate an inside of the evaporative concentration area.

8. The automatic analysis device according to claim 1, further comprising:
a display unit,
wherein the control unit is configured to determine whether the evaporative concentration process is sufficient based on the concentration ratio of the extract solution, and when the evaporative concentration process is determined to be insufficient, an alarm indicating that the evaporative concentration process is insufficient is displayed on the display unit.

9. The automatic analysis device according to claim 2, wherein a sample to be subjected to an evaporative concentration process and a sample not to be subjected to the evaporative concentration process are mixed and are continuously processed at regular intervals.

* * * * *